Nov. 7, 1939.　　　　J. W. OGDEN　　　　2,179,232
POSTAGE METER UNIT
Filed July 25, 1936　　　　4 Sheets-Sheet 1
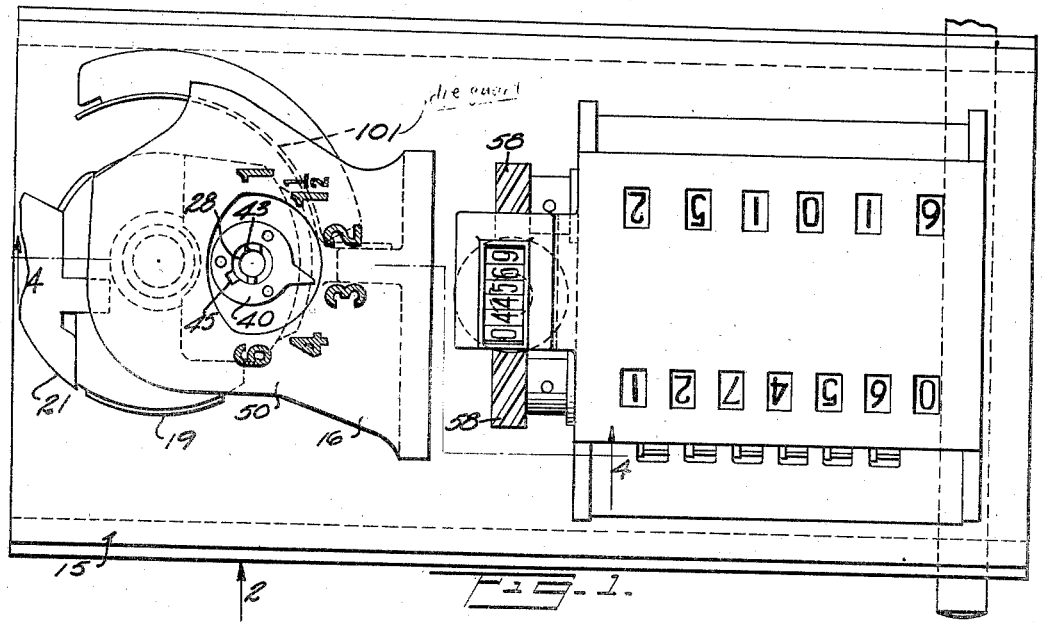
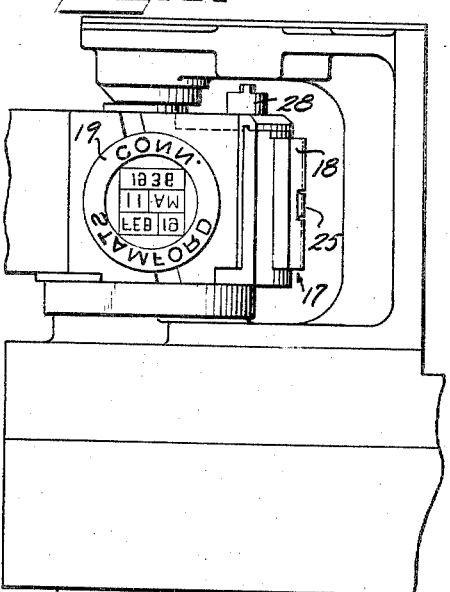
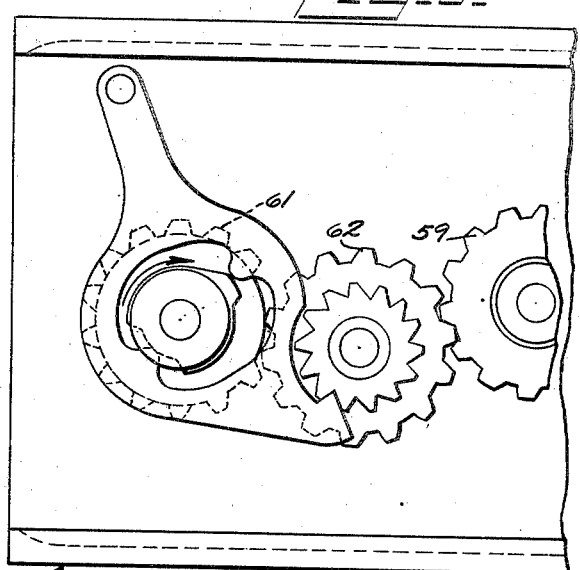
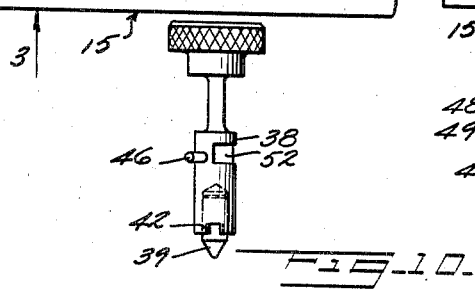
INVENTOR.
Jacob W. Ogden
BY
ATTORNEY.

Nov. 7, 1939.  J. W. OGDEN  2,179,232
POSTAGE METER UNIT
Filed July 25, 1936  4 Sheets-Sheet 2
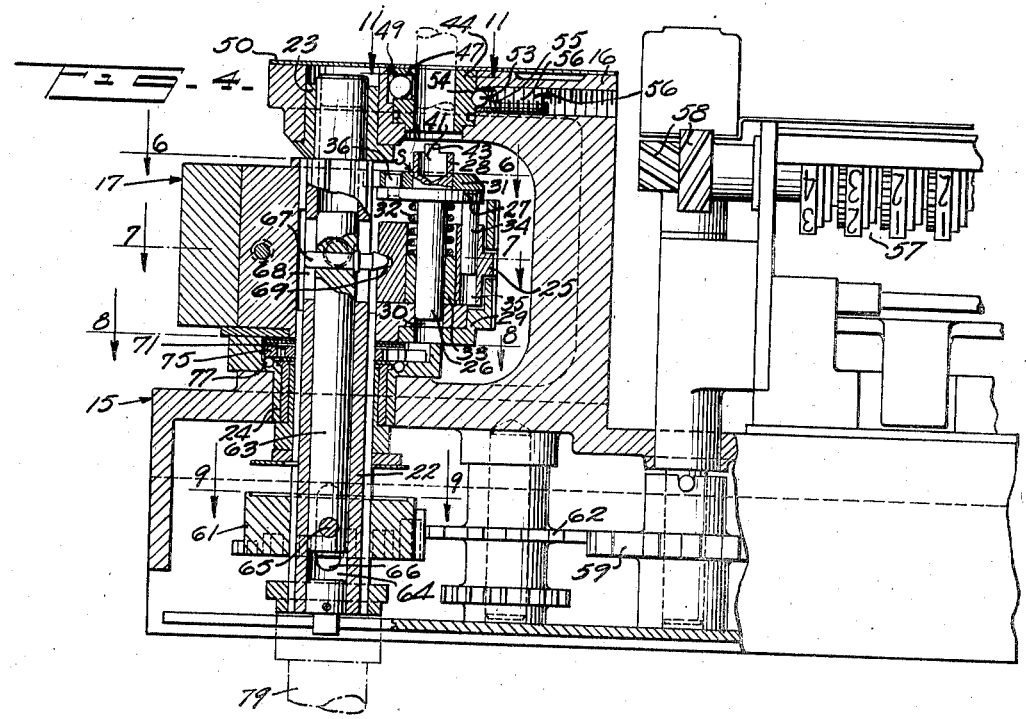
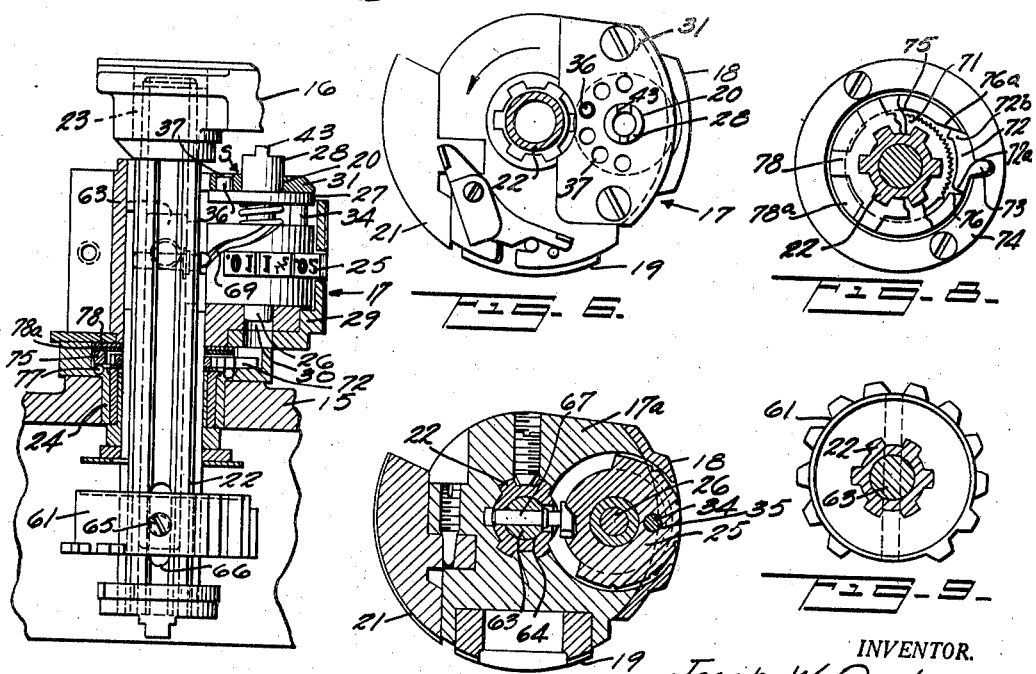
INVENTOR.
Jacob W. Ogden
BY
Edwin H. Owen
ATTORNEY.

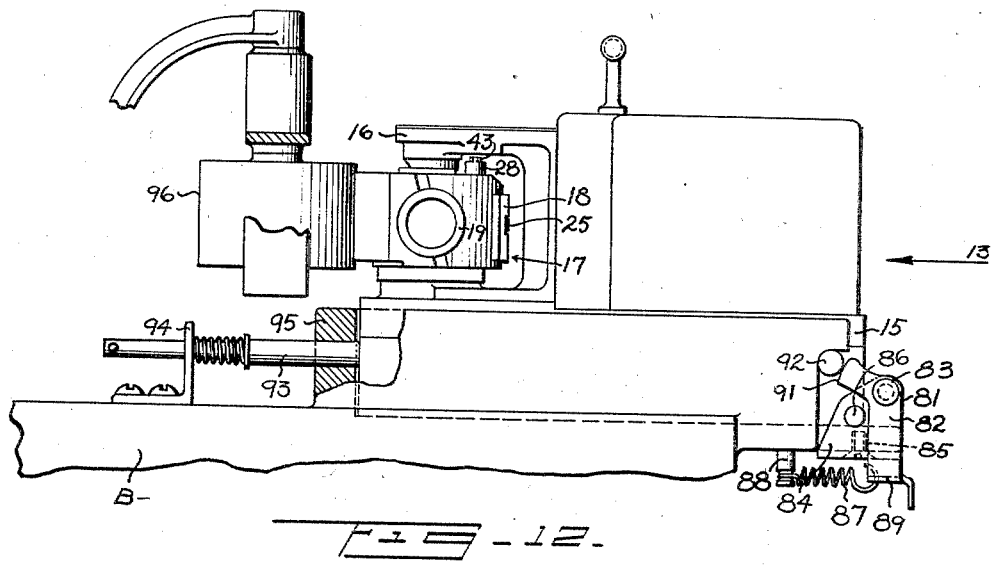
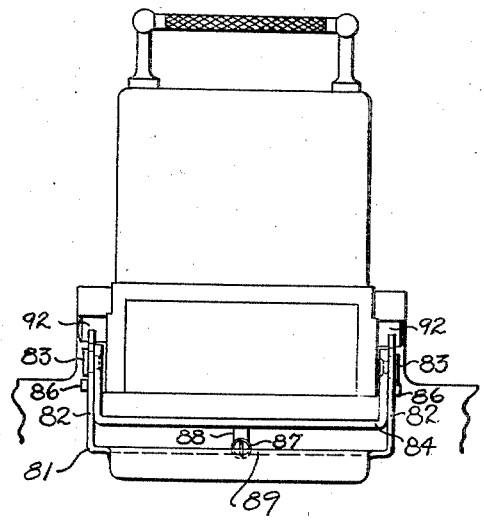

INVENTOR.
Jacob W Ogden
BY
ATTORNEY.

Patented Nov. 7, 1939

2,179,232

UNITED STATES PATENT OFFICE 2,179,232

POSTAGE METER UNIT

Jacob W. Ogden, Springdale, Conn., assignor to Pitney-Bowes Postage Meter Co., Stamford, Conn., a corporation of Delaware Application July 25, 1936, Serial No. 92,498

7 Claims. (Cl. 101—91)

This invention relates to a portable meter unit for use with a class of machines commonly known as postage meter machines of the type disclosed in Re. Patent 15,734.

The features of the invention particularly relate to a multi-value printing die and associated mechanism which are adapted to cooperate with an indicia printing die and registering mechanism, to print and register any value set up.

One object of the invention is to provide a rotary indicia printing die, which is particularly adapted for use with high speed metered mailing machines, and which includes a multi-value printing die having a multiple number of numeral type faces which are adapted to cooperate with the printing die to print any one of a number of numeral values, and further, to provide a selector mechanism which will move with the indicia printing die and multiple value printing die as a unit, during a printing operation.

It is a further object of the invention to provide a variable drive gear, having a variable number of teeth, which gear is adapted to be adjusted in accordance with the value set up in the multi-value printing die, which, through the medium of a novel drive connection provided between a counter mechanism and variable drive gear, will register in said counter mechanism the value set up.

Another object of the invention is to provide means whereby the selector may be actuated by means of a removable key, and whereby said key can only be removed after the value printing die is set in an exact printing relation with the indicia die.

Another object of the invention is to provide a device whereby the indicia die can only be rotated in one direction.

Another object is to provide a novel form of structure for clamping the meter unit to the base which will become self-adjusted to a clamping position after the meter unit is moved to its home position on the machine base.

A further object of the invention is to provide a locking mechanism to lock the printing member in a guarded non-printing position and to provide a combination of locking devices each of which is adapted to be moved a predetermined distance from a key structure on the machine base to effect the release of the locking structure.

With the foregoing and other objects in view, which will appear as the description proceeds, the invention resides in the combination and arrangement of parts and in the details of construction hereinafter described.

A preferred embodiment of the invention is illustrated in the accompanying drawings, wherein:

Fig. 1 is a plan view of the meter unit;

Fig. 2 is a side elevational view, looking in the direction of the arrow 2 on Fig. 1, with part broken away;

Fig. 3 is an inverted plan view looking in the direction of the arrow 3, on Fig. 2;

Fig. 4 is a vertical sectional view taken along the line 4—4 of Fig. 1;

Fig. 5 is a fragmentary view, with part in section and part in elevation of parts of the mechanism shown in Fig. 4;

Fig. 6 is a plan sectional view taken along the line 6—6 of Fig. 4;

Fig. 7 is a plan sectional view taken along the line 7—7 of Fig. 4;

Fig. 8 is a plan sectional view taken along the line 8—8 of Fig. 4;

Fig. 9 is a plan sectional view taken along the line 9—9 of Fig. 4;

Fig. 10 is a vertical elevational view of the key which is used in conjunction with the selective mechanism;

Fig. 11 is a plan sectional view taken along the line 11—11 of Fig. 4;

Fig. 12 is a fragmentary side elevational view on a reduced scale with parts broken away and parts in section, showing a meter unit in its clamped position on the machine base;

Fig. 13 is an end elevational view of Fig. 12 looking in the direction of the arrow 13;

Figure 14:
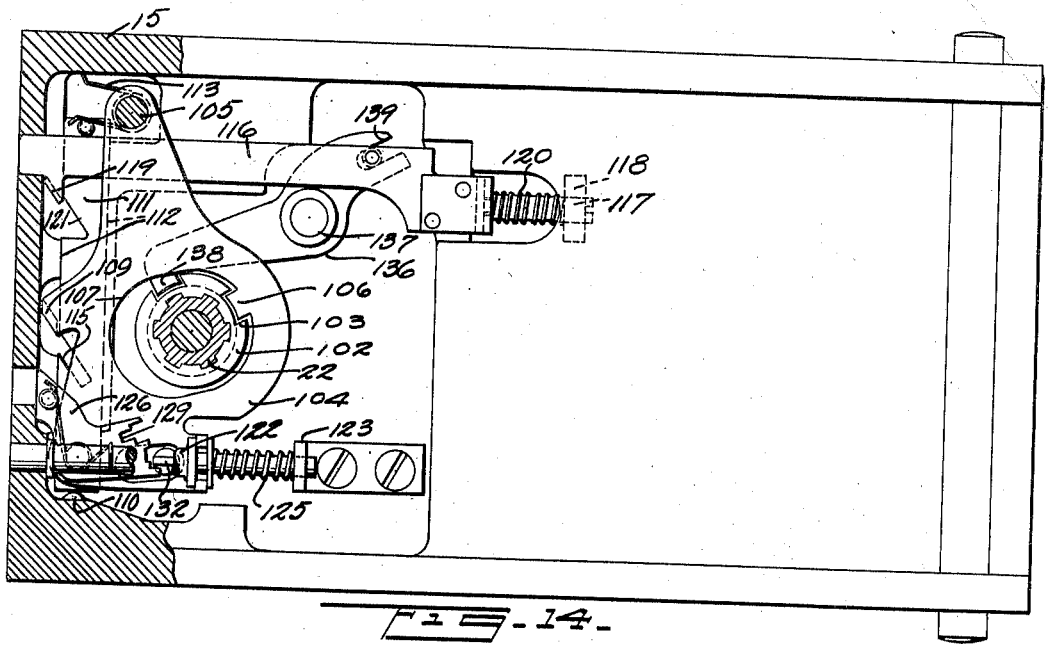
Fig. 14 is a bottom plan view of the meter unit with part in section showing mechanism which is used to lock the shaft, which supports the printing member, in a non-rotative position when the meter unit is removed from the base unit.

Referring now to the drawings wherein like reference characters indicate like parts, the meter unit comprises a frame structure 15 indicated generally by the arrow, Fig. 4, which provides a base and closure for the drive means within the lower portion of the meter unit, and further has a bracket 16 formed integrally therewith, which, in cooperation with the rest of the frame structure is adapted to support an indicia printing member, indicated generally by the arrow 17.

Said indicia printing member 17 comprises a block 17a which is formed as shown in Fig. 7 to accommodate a postage stamp indicia printing die, as indicated at 18, a postmarking die as indicated at 19 and a slogan die as indicated at 21, and further, is adapted to be fixed to a splined shaft 22, which shaft is rotatably mounted in suitable bearings 23 and 24 provided in the bracket portion 16 and base portion 15 respectively.

Within the indicia printing member 17 is a multi-value printing die 25, which comprises a substantially ring shaped member having numeral value printing type along a portion of the peripheral surface thereof, and is positioned within the indicia printing member in such manner as to bring the numeral value type printing surfaces thereof into cooperative printing relation with the type surface of the indicia printing die.

Said multi-value printing die 25 is rotatably movable about a stem 26 which projects downwardly from a flanged portion 27 of a selector member, indicated by the arrow S, Fig. 4. The lower end of said stem 26 projects within an opening 30 in the lower portion 29 of the indicia printing member 17, while a pintle 28, extending above the flanged portion 27, projects through an opening 23, Fig. 5, in an upper wing portion 31 of said indicia printing member.

By means of a compression spring 32, compressed between the lower surface of the flanged portion 27 and the upper end of a bushing 33, positioned within the multi-value printing die 25, the flange 27 of the selector member S is normally forced upward into yieldable engagement with the lower surface of the upper wing portion 31 of the indicia die member.

By means of a pin 34, extending downwardly from the flanged portion 27 of the selector member S, and projecting within an opening 35 in the multi-value printing die 25, the said die 25 is adapted to be moved to bring the desired numeral type into a printing position when the selector member S is rotated. Also by means of a pin 36 projecting upwardly from the flanged portion 27 into one of a series of openings 37, in the upper portion 31 of the indicia die member, Fig. 6, the selector member is adapted to be held in a fixed adjusted position.

Cooperating with said selector member S is a detached actuating key 38, best shown in Fig. 10, which has a nose portion 39, which is adapted to fit within a bore 41 in the upper end of the pintle 28, and has slots 42 in the lower end thereof, which slots are adapted to be engaged by projections 43, extending upwardly from the pintle. Said slots 42 and projections 43 are further arranged, to restrict the placement of the key to a single operative position, by varying the widths thereof.

Further cooperating with said key and selector member, is a means for obstructing the removal of the key until the multi-value printing die is set with a numeral type in correct printing position. Said means comprises a bushing 44, which is rotatably positioned within the upper end of the bracket 16, as best shown in Fig. 4, and has a slot 45, Fig. 1, which is adapted to be engaged by a pin 46, projecting sidewardly from the key 38, to thereby provide means for rotating the bushing 44, when the key and selector S are rotated.

As best shown in Figs. 4 and 11 the bushing 44 has one radial opening 47 therein, within which a ball 48 is positioned. Said ball is adapted to cooperate with any one of a number of vertical slots 49 in the bracket 16, which slots correspond in number with the number of positions required for setting the numeral type portions of the multi-value printing die 25. Said slots are so arranged, that when any one slot coincides with the radial opening 47 the key 38 can be inserted or withdrawn, but while setting, if a numeral type should not be set in an exact printing relation with the indicia printing member, the removal of the key will be prevented. This condition is effected through the movement of the ball 48, which, when in the position shown in Fig. 4, that is when the ball 48 is directly in alignment with one of the vertical slots 49, will have sufficient space to move into to clear the key, but if the ball is not in alignment with one of the slots 49, or in other words rests upon the surface of the bore 51, the opposite end of said ball 48 will project within a groove 52 in the key 38 a sufficient distance to obstruct the withdrawal of said key.

After the removal of the key 38, the bushing 44 is maintained in its set position, to permit the re-insertion of the key, by means of a detent ball 53, Fig. 4, which ball is maintained in engagement with one of a series of slots or detents 54 in said bushing 44, by means of a compression spring 55, the tension of which is adapted to be adjusted by means of a screw 56 in the bracket 16.

From the foregoing it will be seen that to adjust the multi-value printing die 25 the key 38 is first inserted within the bushing 44 to bring its nose portion 39 into engagement with the bore 41 of the pintle 28, and when in clutched engagement therewith, said key is pressed downward to disengage the flanged portion 27 of the selector member S from its locked relation with the wing 31 of the indicia printing member, then, upon rotation of the key, the multi-value printing die 25 is adapted to be rotated by means of the driving pin 34, to move a selected numeral printing type to a printing position. Upon reaching the desired printing position, the key can be withdrawn without interference but if not correctly set, interference will ensue, and the removal of the key will be obstructed until the proper setting is made.

An indicator or pointer 49 is also provided on the upper surface of the bushing 44, which is adapted to cooperate with a numbered face on an upper face plate 50, which covers the upper surface of the bracket 16, when changes in the value of the stamp impression are to be made.

While an adjustment is being made to bring a selected numeral type into printing position, it becomes necessary to also arrange for the correct setting of the counter or registering mechanism, which will now be described.

Referring to Fig. 4, the counter or registering mechanism, indicated at 57, preferably comprises a total and subtracting counter, such as indicated by the two rows of numerals in Fig. 1, which counters are simultaneously driven by means of gear drive 58 directly connected therewith, in cooperation with a driven gear 59, within the base of the meter unit.

A variable drive gear 61 is slidably mounted on the splined shaft 22, which supports the indicia die member, and has a variable number of driving teeth thereon which are adapted to be moved into variable driving relation with an idler gear 62, to rotate the idler gear during a printing cycle of operation. The variable drive gear 61 will be rotated one revolution during each printing cycle of operation, while the rotation of the counter drive gear 59 will vary in accordance with the number of teeth on the variable drive gear which are brought into driving relation with the idler gear 62.

To effect the moving of the desired number of teeth of the variable drive gear into driving relation with the idler gear 62, means is provided for adjusting said variable drive gear 61 longitudinally along the splined shaft 22, which means includes a longitudinally slidable rod 63, slidable within a central bore 64 in the spline shaft 22. Said rod has a pin 65 extending through the lower end thereof and through elongated clearance slots 66 in each side of the splined shaft, and further has its ends fixed within the variable drive gear 61. Another pin 67 provided at the upper end of the splined shaft 22, projects through elongated slots 68 in said splined shaft and has one end thereof extending into a spiral slot 69 provided in the rearward surface of the multi-value printing die member 25.

It will be obvious that when an adjustment is made through the selector S, to bring a desired numeral type into printing position, the rotation of the multi-value printing die will cause the pin 67 to change its position, due to the spirally shaped slot 69, and thereby accordingly move both the slidable rod 63 and the variable drive gear 61, longitudinally of their axis.

For each change of position of the multi-value printing die, the variable drive gear 61 will receive an equivalent change of position, to thereby arrange the particular number of teeth on the variable drive gear in a driving position with relation to the idler gear 62, which will agree with the particular numeral value of the numeral type selected for printing.

It will be noted that when the indicia printing die is in its home position, the printing surface thereof is facing the rear wall of the bracket 16 in such manner as to render it difficult or impossible to take fraudulent impressions on mail matter from said printing surface. To prevent the indicia die member from being moved in a reverse direction, an anti-reverse member is provided which will now be described.

Referring to Fig. 8, a pawl and ratchet structure is shown wherein a ratchet member 71 is secured to the splined shaft 22 and wherein a pawl 72 is provided which is mounted within a slot 76 in a ring 75, which pawl has a tail portion 73 anchored within a stationary support 74. Said ring 75 is frictionally held against a ball bearing surface 77 by means of a spring washer 78 and a flat washer 78a, Figs. 5 and 8, positioned above the ring 75, which spring washer is compressed by the indicia die assembly to thus cause a driving force to be exerted against the upper surface of the ring 75 upon movement of the indicia die member in either direction of rotation.

When the indicia die member is rotated in the proper direction for printing, that is in the direction of the arrow as viewed in Fig. 6, the ring 75 will be urged in the same direction to thereby cause the pawl 72 to be rocked about the anchor or tail point 73 as a pivot, when the rear end 72a of the pawl is forced forward by the ring. This will cause the ratchet engaging end 72b to be held out of engagement with the ratchet member 71 and, with the pawl in this position, the indicia die member will be permitted to rotate freely.

If an attempt is made to move the indicia printing member in a reverse direction, the frictional contact of the indicia printing member with the upper surface of the ring through the engagement of the spring washer 78, will urge the ring to rotate in a reverse direction and thereby cause a cam surface 76a, formed at one side of the slot 76, to cam or rock the pawl 72 into engagement with the ratchet member 71, to thereby obstruct further movement of the ratchet and the indicia printing member.

When the meter unit is properly set in operating relation with a metered mailing machine, such as the type disclosed in the aforementioned Re. Patent 15,734, the splined shaft 22 will be connected in driving relation with a power driven, one revolution clutch controlled shaft 79, as indicated by the broken lines in Fig. 4.

To set up the desired value within the indicia printing die, the key 38 is inserted within the bushing 44, and when properly seated in driving engagement with the selector S, it is depressed to disengage the selector from its locked position, then is rotated either in a clockwise or a counter-clockwise direction.

The multi-value printing die 25 will be thus rotated, and the rotation thereof will cause the variable drive gear 61 to be adjusted longitudinally of its axis, through the connection of the rod 63 and pins 65, 67, to bring a greater or lesser number of gear teeth on said variable drive gear 61 into driving relation with the idler gear 62 and consequently alter the drive of counter drive gears 58.

The counter wheels, which are driven through the units wheels and are preferably of the Geneva transfer type, will thus have their units wheels driven one unit for each tooth of the number of teeth on the variable drive gear which will engage the idler gear during the rotation of said variable drive gear.

Referring to Figs. 12 and 13, wherein a meter unit is shown mounted in an operating position on the machine base B, a means for clamping the said meter in its operating position is shown. Said clamping means includes a substantially U shaped member 81 which has two arms 82—82 with the free ends thereof extended inwardly and pivotally mounted on rivet studs 83—83 fixed within a bracket 84. The bracket 84 is secured to the base by means of a screw as indicated at 85 and has a stop pin 86 extending outward from each side thereof. Below the bracket 84, a spring 87 is stretched between a pin 88 in the machine base B and a portion of the cross piece 89 on the U shaped bracket member, to thereby normally urge the lower arm portions of the clamp member toward the stop pins 86.

A convex curvature 91 is provided at the end of each clamping arm 82—82, said curvature being concentric with the pivotal point or axis of said arms.

Two lugs 92—92 which extend outward from each side of the meter unit are adapted to be engaged by the curved ends 91 of the clamping arms 82 when the meter unit is moved inward to an operating position within the machine base.

A tension member is also provided which is adapted to be engaged by the forward end of the meter unit when the latter is moved to an operating position. Said tension member comprises a rod 93 slidably mounted along a horizontal plane within bearing members 94 and 95, and is normally urged to the right, as viewed from Fig. 12, to extend one end thereof beyond the inner face of the bearing 95 and into the path of the meter unit.

When placing the meter unit in an operating position within the machine, with the indicia printing member in operative relation with an impression member 96, the said meter unit is moved forward along the guideways within the base until the forward end of the meter unit engages the inner wall of the bearing 95. The lugs 82 extending from the meter unit will, in the meantime, have engaged and passed over the upper edges of the arms 82—82, thereby deflecting the inwardly extended ends of the arms 82—82 downward, then upon passing the curved ends 91, the arms 82—82 are returned to a normal position by means of the spring 87, to permit the meter unit to become self-adjusted between the tension member or rod 93 and the curved ends 91—91 of the clamping arms 82—82. With the curvature 91—91 arranged concentric to the pivotal point of the arms 82—82, the said arms will immediately swing to an adjusted position, and regardless of whether the downwardly extended arms are drawn back into engagement with the stop pins 86 or not, the meter unit will always be in the same adjusted position.

It will be noted that the upper edges of the arms 82 have a concave shaped contour. This is provided to permit the lugs 82 to have a smooth camming action when passing thereover to thereby prevent any obstruction which might cause a jamming action, in moving the meter unit to its home position.

Also associated with the meter unit is a means for locking the indicia printing die and printing member in a guarded non-printing position when the meter is removed from the base unit B. When in a non-printing position the indicia printing die 18 is facing the rear or the bracket 16, from which position it is protected from the taking of fraudulent impressions, a die guard indicated at 101 of Fig. 1 being arranged so as to prevent passing strip material, such as is used for stamps, to a convenient position for the wiping of impressions from the indicia printing die.

A locking means is provided which comprises a combination of locking members which are adapted to be moved in such manner as to release the printing member to permit the rotation thereof during operation of the machine, when the meter unit is placed in a printing position upon the machine base, said release being effected through the engagement of a plurality of keys with said locking members in a predetermined definite order.

Figure 17:
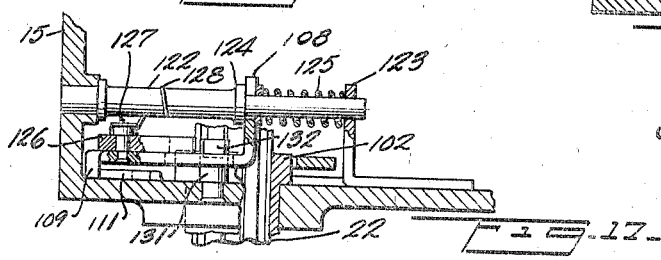
Fig. 17 is a fragmentary detail section taken along the line 17—17 of Fig. 15.

Included with said locking means is a collar 102 which is fixed on the splined shaft 22 and has two radial slots 103—103′ therein. Cooperating with said collar 102 is a lock plate 104 which is pivotally mounted upon a stud 105 and has a key 106 which is adapted to engage with the slot 103. Said lock plate 104 further has an elongated opening 107 therein through which the splined shaft 22 passes and is arranged to permit a rocking movement of said lock plate. As best shown in Fig. 17 said lock plate is also provided with one upturned fork member 108 and downwardly disposed lug 109.

A slide plate 111, suitably guided between the side walls 112—112 of a slot provided along the inner surface of the frame structure 15, is normally urged in one direction against a stop 110 by means of a spring 113. When in said normal position, one side of the slide plate 111 is positioned directly in the path of one edge of the lug 109 on the lock plate 104 as best shown in Fig. 14, therefore, any rocking motion of the lock plate 104 is prevented.

Figures 15, 16:
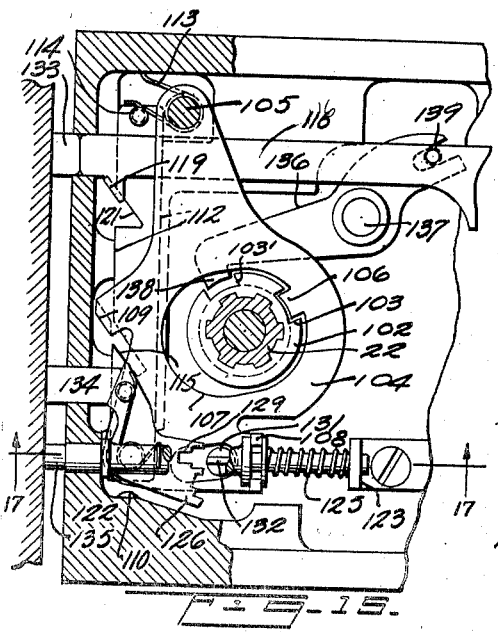
Fig. 15 is a fragmentary view similar to that shown in Fig. 14 but showing a meter unit partially moved into a locking position, that is, with the lock releasing keys partially actuating the locking mechanism.
Fig. 16 is a view similar to Fig. 15, with the meter unit moved to its operating position and showing the locking mechanism in an unlocked position.

To provide for the rocking of said lock plate 104, to a lock releasing position, the said slide plate is provided with an angularly disposed slot 115, which, when the slide plate is moved to the position shown in Fig. 15, will provide a clearance for the said lug 109 when the lock plate is moved to the position shown in Fig. 16.

To move the slide plate 111 from the position of Fig. 14, to that of Fig. 15, a camming member is provided which comprises a bar 116 having one end guided within an opening in one wall of the casing 15, the opposite end being guided by means of a screw or stud member 117, which is secured to a portion of said bar 116 and is slidable within an opening in a lug or bracket 118 formed as a part of the frame 15. By means of a spring 120 around the stud 117, the bar 116 is normally urged in one direction.

An angularly disposed ear 119, which forms the cam portion of said camming member, projects beyond one side of the bar 116 and is adapted to be moved into engagement with one edge of an angularly disposed slot 121 in the slide plate 111. As best shown in Fig. 15, it will be seen that upon movement of the bar 116 inward a predetermined distance, the ear 119, upon engagement with one edge of the slot 121, will cam the slide plate 111 sideward to align the slot 115 in said slide plate with the lug 109.

Having the slide plate in the position last described, the next step in releasing the locking structure is to rock the lock plate 104 from the position shown in Fig. 15 to that of Fig. 16. This rocking movement is accomplished by the inward movement of a pin 122, said pin being guided within an opening in one wall of the casing 15 and an opening in a bracket 123. Said pin 122 is further arranged within the forked end of the forked member 108 and has a flanged portion 124 in engagement with one face of said forked member. Therefore, upon movement of the pin the rock plate will be rocked about the stud 105. By means of a spring 125 said pin 122 and the lock plate 104 are normally maintained in the position shown in Fig. 14.

Before the lock plate 104 can be moved inward to a released position however, another locking member, which forms a part of the combination locking structure, must first be moved to a predetermined position. Said member comprises a rocker arm 126 which is pivotally mounted upon a stud 127 fixed within the lock plate 104 and is normally maintained in the position shown in Fig. 14 by means of a spring 128. At the inner end of said rocker arm, a series of slotted portions are provided which extend inward to provide a series of steps or obstructions, one of said slots indicated at 129 extending inward further than the other slotted portions. Cooperating with said slotted portions is a fixed pin 131 having a narrow fin 132 provided at its upper end, which fin will normally provide an obstruction to prevent movement of the lock plate 104 to a releasing position until the rocker arm 126 is moved the desired amount to bring the slot 129 directly in the path of the fin 132.

It will thus be seen that with the combination lock provided, the printing member is adequately locked in its non-printing position when the meter unit is removed from the base B.

When the meter unit is placed upon the base, a series of unlocking pins or keys 133—134 and 135 projecting from said base are adapted to engage with the bar 116, rocker arm 126, and pin 122 respectively, and when the meter unit is moved to its operating position, or the position as shown in Fig. 16, the combined locking members will all have been placed in their locked releasing positions.

An auxiliary locking arm 136 is also provided which arm is pivotally mounted upon a stud 137 and has one hook shaped end 138 which is adapted to engage the slot 103' in the collar 102 and further, has one forked end in engagement with a pin 141 projecting from the bar 116. Upon movement of said bar 116 inward, the arm 136 will be rocked about its pivot stud 137 to release the hooked end 138 from engagement with the key slot 103'.

Having described my invention, I claim:

1. In a portable meter unit for use with a metered mailing machine, a frame, an indicia printing die member, rotatably mounted in said frame, a multi-value printing die rotatably mounted in cooperative printing relation with said indicia printing die member, manually operable selector means having a driving connection with said multi-value printing die, a normally locked but yieldably releasable engaging member between the indicia printing die member and the value printing die, to normally maintain the multi-value printing die in a locked relation with the indicia printing die, a removable selector key, a sleeve rotatably mounted within the frame, and locking means including movable means confined within an opening in the sleeve and cooperating with a plurality of recessed portions in the frame immediately surrounding said sleeve and a groove in said key, whereby when the key is inserted and rotated, the movable means will enter the recessed portions to permit the removal of the key when the selected multi-value printing die is set in its correct printing relation with the indicia printing die member and will enter the groove in the key to prevent the withdrawal of the key when the selected printing die is not in its correct printing relation with the indicia printing member.

2. In a mailing machine, a housing removably mounted on said machine, a tension member arranged so as to be engaged by the housing when the latter is operatively positioned in the machine, a clamping member including clamping arms pivotally mounted on the machine, and means including a convex end portion on each clamping arm concentric with the pivotal point, whereby said clamping arms are adapted to engage said housing to hold same in a clamped position against the tension of the tension member.

3. In a mailing machine a housing removably mounted on said machine, clamp lugs projecting from said housing, a tension member arranged so as to be engaged by the housing when the latter is operatively positioned in the machine, a clamping member including clamping arms pivotally mounted on the machine, and means including a convex end portion on each clamping arm concentric with the pivotal point, whereby said clamping arms are adapted to engage said clamp lugs to hold the housing in a clamped position against the tension of the tension member.

4. In a mailing machine, a removable housing having a printing member associated therewith, an impression member associated with the machine, a tension member arranged so as to be engaged by the housing when the latter is operatively positioned in the machine, a clamping member including clamping arms pivotally mounted on the machine, and means including a convex end portion on each clamping arm concentric with the pivotal point, whereby said clamping arms are adapted to engage portions of said housing to hold same in a clamped position against the tension of the tension member and to maintain the printing member in a correct printing relation with the impression member.

5. In a mailing machine, a base, a housing removably mounted on said base, lugs projecting from said housing, a tension member positioned in the path of the housing, a clamping member including clamping arms pivotally mounted on the base, means including a convex end portion on each clamping arm concentric with the pivotal point, and spring means to urge the clamping arms upward into the path of said lugs, whereby when the housing is forced home against the tension member, the lugs will deflect said arms and on passing the ends thereof the housing will become adjusted to a normal clamped position between the convex ends and tension member.

6. In a machine of the character described having a base unit and a detachable meter unit, a printing member associated with said meter unit, a combination lock structure including a plurality of members each having a predetermined order of movement and normally arranged to lock said printing member in an inoperative position when the meter unit is detached from the base unit, and a plurality of key members associated with the base unit and arranged to enter one end of said meter unit to move and release the lock members from their locked position when the meter unit is in an operating position on the base unit.

7. In a machine of the character described having a base unit and a detachable meter unit, a printing member associated with said meter unit, a combination lock structure including a locking member arranged to normally prevent movement of the printing member when the meter unit is detached from the base unit, means to move said locking member to release the printing member, a plurality of obstruction means to prevent the movement of the locking member, and a key structure associated with the base unit and engageable with said locking structure through one end of the meter unit to move the obstruction members and locking member to a lock releasing position.

JACOB W. OGDEN.